United States Patent [19]

McKenney et al.

[11] 4,396,944

[45] Aug. 2, 1983

[54] VIDEO IMAGE SIZE SCALING

[75] Inventors: John R. McKenney, Broken Arrow; Robert H. Lacy; Gordon R. Stallings, both of Bartlesville, all of Okla.

[73] Assignee: Phillips Petroleum Company, Bartlesville, Okla.

[21] Appl. No.: 303,300

[22] Filed: Sep. 15, 1981

[51] Int. Cl.³ .............................................. H04N 7/18
[52] U.S. Cl. ..................................... 358/107; 358/99; 358/183; 358/903
[58] Field of Search .................. 358/93, 103, 107, 183, 358/227, 99, 903

[56] References Cited

U.S. PATENT DOCUMENTS

| 3,175,089 | 3/1965 | Talley | 358/107 |
|---|---|---|---|
| 3,522,764 | 8/1970 | Biber | 354/195 |
| 3,678,192 | 7/1972 | Akuta | 358/107 |
| 3,738,248 | 6/1973 | Fish . | |
| 3,766,518 | 10/1973 | Rilott | 340/3 R |
| 4,031,544 | 6/1977 | Lapetina | 358/99 |
| 4,153,357 | 5/1979 | Winnacker | 354/64 |
| 4,207,594 | 6/1980 | Morris | 358/107 |
| 4,314,750 | 2/1982 | Orban | 358/227 |

FOREIGN PATENT DOCUMENTS 515931  8/1976  U.S.S.R. .............................. 358/107

OTHER PUBLICATIONS

*Electronics,* Oct. 26, 1978, "TV Camera Based on Ultrasonic Energy . . . ", pp. 70, 72.
Hydro Products Brochure, "PATZ", 2 pages.
Reibikoff, "DR 631 Full Color Underwater Television".
*IBM Technical Disclosure Bulletin,* vol. 7, No. 2, Jul. 1964, "Projected Display Measurement", p. 144.

*Primary Examiner*—Howard Britton

[57] ABSTRACT

The size of an object in the field of view of a television camera or other device which can create an image of an object is determined by generating a calibrated grid for a video display in response to a measurement of the distance between the image creating device and the object itself. Both the object and the grid may be displayed on a video display means in such a manner that the object is overlaid with the calibrated grid. The length of the lines in the calibrated grid or the distance between points in the calibrated grid, as actually displayed, will be representative of a particular distance and thus an observer viewing the video display can determine the actual size of the object by using the calibrated grid to actually measure the object.

22 Claims, 7 Drawing Figures

VIDEO IMAGE SIZE SCALING

This invention relates to video image size scaling. In one aspect, this invention relates to method and apparatus for generating a grid on a video display, wherein such grid is scaled so as to provide a measurement of the size of an object displayed on the video display.

Television cameras and other devices which can create an image of an object are often utilized to inspect structure or objects which are not easily accessible to actual visual inspection by a person who desires to make such an inspection. This is particularly true in underwater inspections and surveys such as the inspection of underwater structures or pipelines, sea bed site surveys prior to laying pipelines, surveys for drilling sites, and surveys for platform construction sites. Also, such image creating equipment is commonly used for inspections in hostile environments such as the reactor areas of nuclear power plants.

When using a television camera to view structure or objects which are not easily accessible, it is often difficult and time consuming to obtain accurate and reliable size information concerning the structure or objects. The distance of the camera from the object will generally not be known and also the angle at which the camera is viewing the object may not be known. In underwater situations, divers often must physically measure objects of interest which are located by the television camera. This is especially true in offshore platform inspections where it is critical to obtain accurate and reliable information concerning the size of a defect in the platform structure. However, such defects may be located below the maximum diving depth for a diver and in any event there is considerable expense and a potential for personnel hazards when a diver must be utilized to measure an object of interest such as a defect in a platform structure.

One technique which has been utilized to overcome the necessity of using a diver to actually measure an object of interest or to obtain a measurement in a hostile environment is the use of a television camera equipped with a measuring frame. The measuring frame is placed in contact with the object of interest and thus provides a reference which can be utilized to determine the size of the object of interest. However, it is often difficult to place measuring frames in contact with the object of interest and further, measuring frames attached to a television camera make the television camera more difficult to handle and such measuring frames are easily entangled with cables and other structure and are thus subject to damage.

It is thus an object of this invention to provide a video image size scaling system which avoids the problem of having to use divers to actually measure objects of interest which can be seen by using a television camera or having to use measuring frames. It is another object of this invention to provide method and apparatus for generating a grid on a video display, wherein such grid is scaled so as to provide a measurement of the size of an object displayed on the video display which will allow an operator viewing such video display to directly determine the size of the displayed object.

As used herein, the term "grid" refers to any arrangement of lines or points which may be displayed on a video display. The term "grid" includes, without limitation, squares, rectangles and other geometric structures on a video display; tic-tac-toe or other arrangements of lines on a video display; points separated by some distances on a video display and lines having a certain length on a video display.

In accordance with the present invention, a calibrated grid for a video display means is generated in response to a measurement of the distance between a device, such as a television camera, being utilized to create an image of an object and the object itself. Both the object and the grid may be displayed on a video display means in such a manner that the object is overlaid with the calibrated grid. The length of the lines in the calibrated grid or the distance between points in the calibrated grid, as actually displayed, will be representative of a particular distance and thus an observer viewing the video display can determine the actual size of the object by using the calibrated grid to actually measure the object.

Other objects and advantages of the invention will be apparent from the foregoing brief description of the invention and from the claims as well as from the drawings in which:

The present invention is described in terms of an embodiment in which a television camera is utilized to view an object of interest under water. The distance measuring is based on sonar technology. The image of the object and the calibrated grid are immediately displayed on a CRT monitor. However, the invention is applicable to environments other than underwater and distance measuring based on technologies other than sonar may be used. Also, other image creating devices such as acoustic devices may be utilized in place of a television camera. Also, the image and calibrated grid may be provided to a video tape recorder to be displayed at a later time.

A digital computer is used to generate the calibrated grid. The digital computer presently used is an Apple II+ but other suitable computing systems could be utilized if desired.

Figure 1:
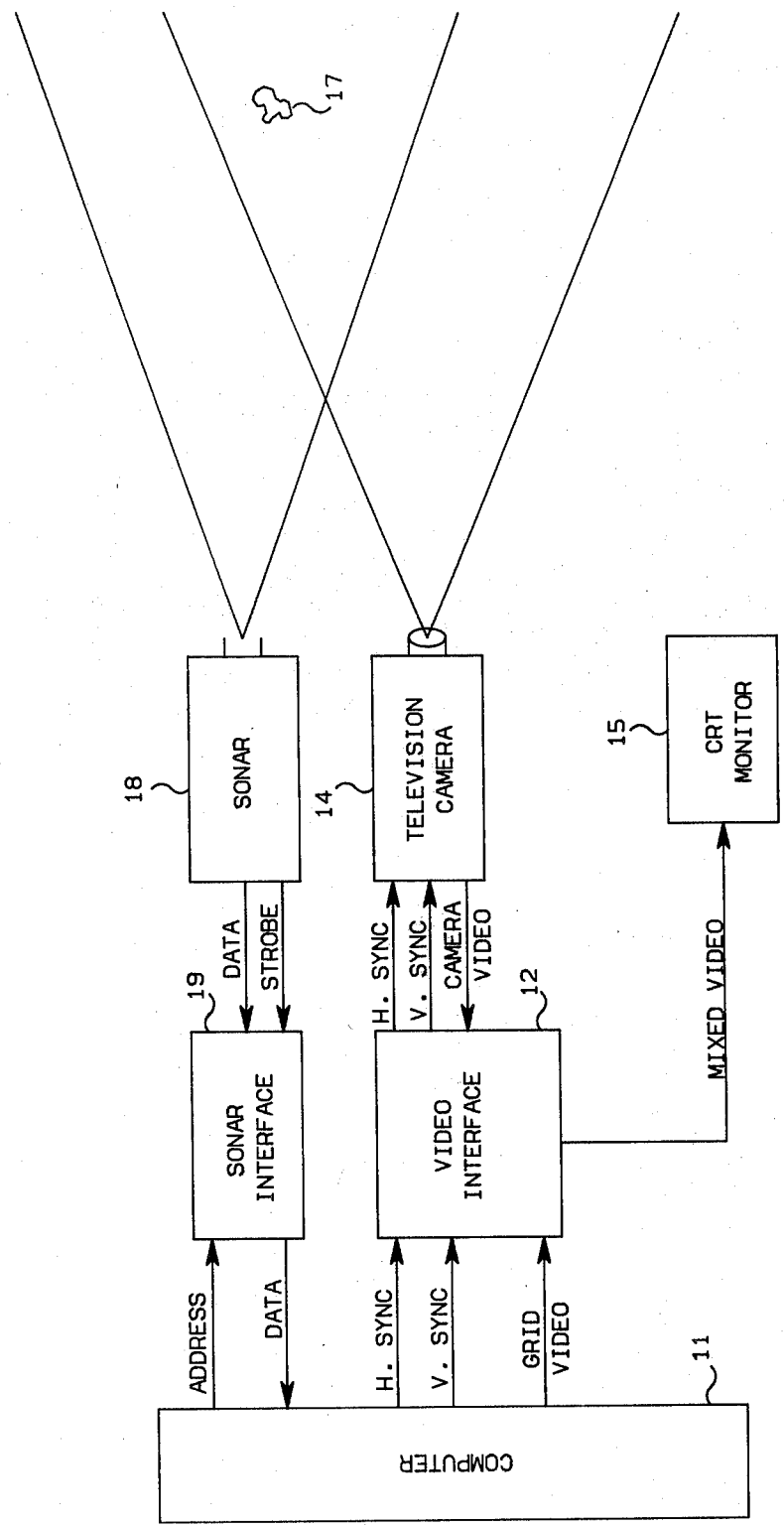
FIG. 1 is a diagrammatic illustration of the video image size scaling system of the present invention.

The invention is also described in terms of particular electrical circuitry which is utilized to interface the various components of the video image size scaling system illustrated in FIG. 1. It is noted that a number of different types of interfacing systems could be utilized to accomplish the purpose of the present invention.

Referring now to the drawings and in particular to FIG. 1, the digital computer 11 provides master timing and synchronization for the video image size scaling system. Horizontal synchronization pulses and vertical synchronization pulses are provided from the computer 11 through the video interface 12 to the television camera 14. The internal sync generator of the television camera 14 is disabled. When horizontal sync pulses and vertical sync pulses are provided from the computer 11 to the television camera 14 and the internal sync generator of the television camera 14 is disabled, the television camera 14 will provide a composite video output signal (referred to in the drawing as camera video) that is synchronized to the video signals generated by computer 11. Thus, the grid video provided from the computer 11 can be combined in the video interface with the camera video provided from the television camera 14 to establish a mixed video signal which is provided from the video interface 12 to the CRT monitor 15 for display. The object 17, which is in the television camera's 14 field of view, will be displayed on the CRT monitor 15. The grid pattern generated by the computer 11 will overlay the display of the object 17.

A sonar device 18 is utilized to determine the distance between the focal plane of the television camera 14 and the object 17. Data and strobe signals from the sonar instrument 18 are provided through the sonar interface 19 to the computer 11. The sonar interface 19 is controlled by address lines from the computer 11 and the strobe signals from the sonar instrument 18. The data supplied from the sonar instrument 18, which is representative of the distance between the focal plane of the television camera 14 and the object 17, is utilized by computer 11 to size or scale the grid which is displayed on the CRT monitor 15 as will be more fully described hereinafter.

The television camera 14 presently used is a Panasonic WV 1300 television camera which has been modified by grounding pins 3 and 11 of IC 502 to disable the camera's internal sync generator. The sonar instrument 18 presently used is a Polaroid Ultrasonic Ranging Unit. Other television cameras and sonar instruments could be utilized if desired. The CRT monitor can be any black and white CRT monitor meeting Electronic Industries Association (EIA) Std. RS-170.

The sonar instrument 18 and the television camera 14 may be mounted in any desired manner so long as the sonar instrument 18 is located so as to be able to provide an accurate indication of the distance between the lens of the television camera 14 and an object of interest in the field of view of the television camera 14. Typically, the television camera 14 and sonar 18 will be mounted close together and will be mounted in such a way that rotation of the television camera 14 and sonar 18 as a unit is possible. The field of view of the sonar 18 and television camera 14 should overlap and the effective beamwidth of the sonar 18 should be less than the field of view of the television camera 14 to insure that the object to camera distance provided by the sonar 18 is for an object in the field of view of the television camera 18. It is noted that distance compensation must be provided if the sonar 18 is not located adjacent the television camera 14 and it may be difficult to meet the preferred field of view and beamwidth criteria without such adjacent location.

Television cameras for viewing objects under water are typically mounted on underwater vehicles or on extension arms which can be operated from the surface. It is contemplated that the sonar unit 18 will be mounted in the same manner as underwater television cameras are typically mounted using techniques which are well known in the art of underwater inspections and surveys.

Figure 2:
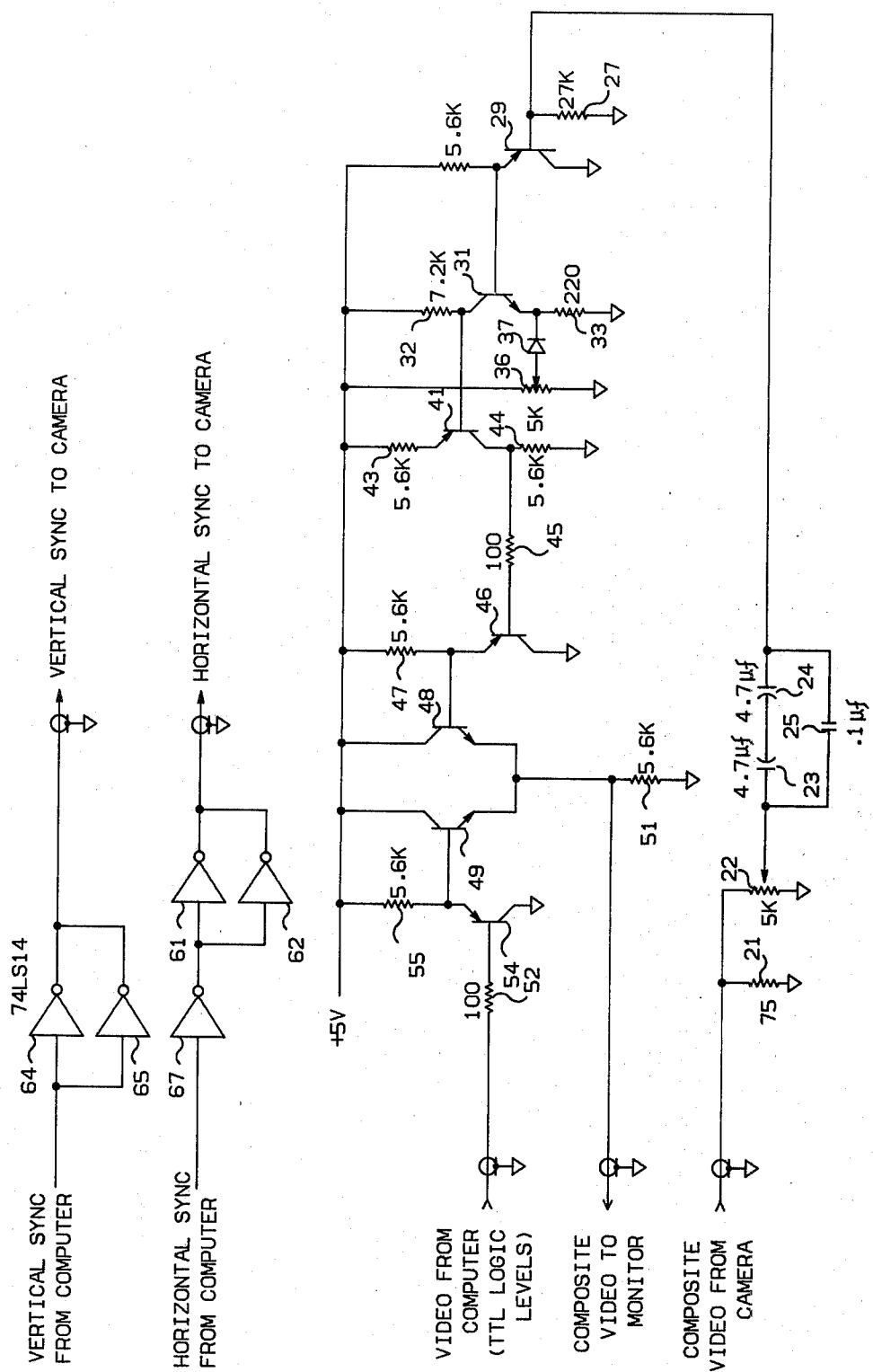
FIG. 2 is a schematic diagram of the video interface illustrated in FIG. 1.
Figure 3:
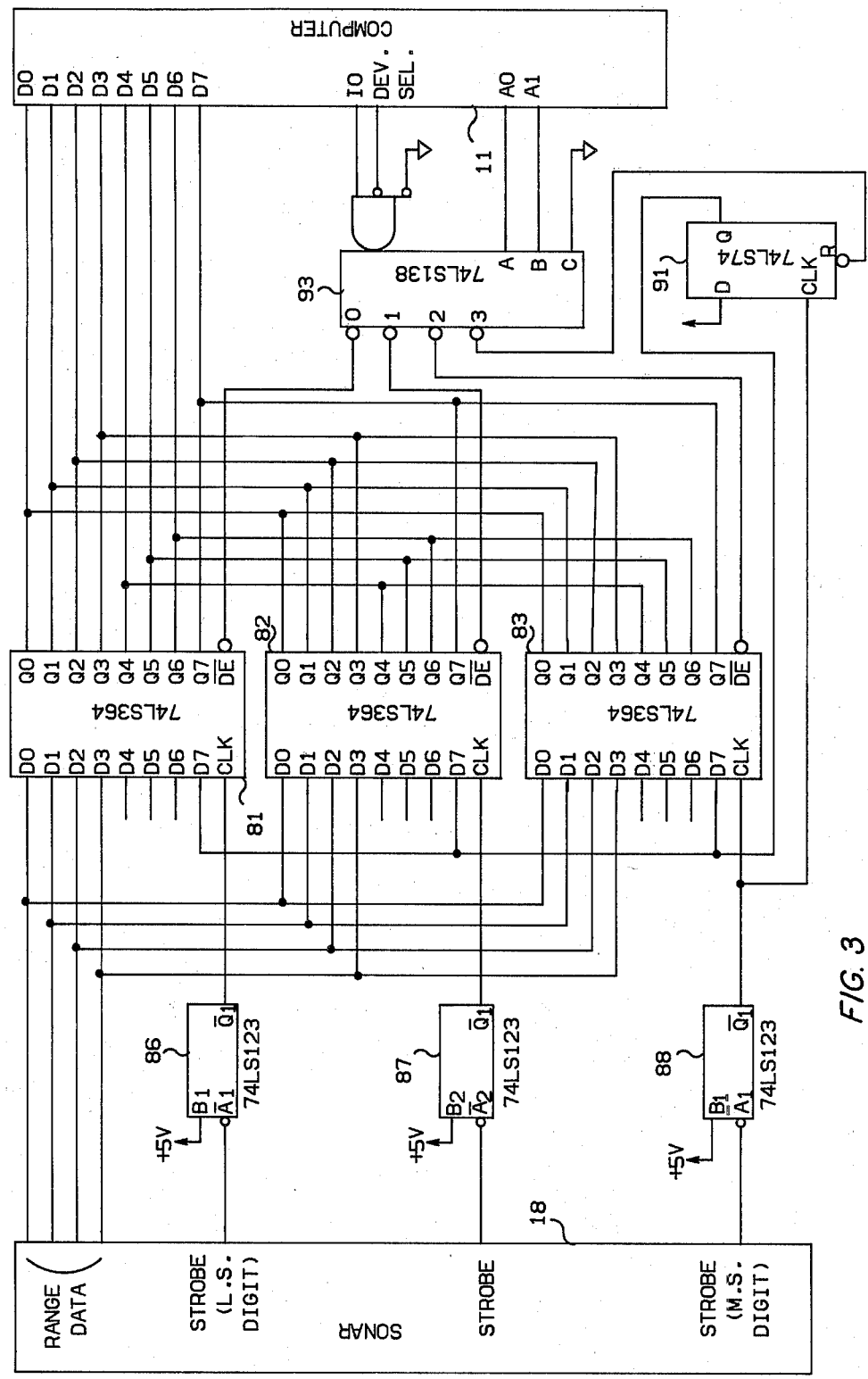
FIG. 3 is a schematic diagram of the sonar interface illustrated in FIG. 1.

A circuit which may be utilized to implement the electronic functions of the video interface 12 is illustrated in FIG. 2 and a circuit which may be utilized to implement the electronic functions of the sonar interface 19 is illustrated in FIG. 3. Many of the integrated circuit (I.C.) chips illustrated as well as components such as resistors, capacitors and diodes may be obtained from a number of manufacturers such as RCA, Motorola, Fairchild and National. The function of each of the I.C. chips and components is fully described by literature supplied by the manufacturers and the manner in which the circuit operates would be obvious to one skilled in the art of electronics. Thus, only a very general description of the manner in which the circuits illustrated in FIGS. 2 and 3 function is provided hereinafter.

Power supplies and other conventional circuitry required by the various I.C. chips have not been illustrated in FIGS. 2 and 3 for the sake of simplicity. Also, additional circuitry required for conventional operation of the various I.C. chips has not been illustrated. Also, in general, only the pins on the I.C. chips actually utilized are illustrated. Again, such power supplies and additional circuitry are specified by the manufacturers and are well known to those skilled in the art of electronics.

Referring now to FIG. 2, all video signals are transmitted on coaxial cable. Also, the vertical sync pulse to the television camera 14 and the horizontal sync pulse to the television camera 14 are conducted on coaxial cable. The camera video signal is applied across resistor 21 which provides an impedance match to the coaxial cable. The potentiometer 22 is utilized as an attenuator and may be considered a contrast control. Capacitors 23-25 and resistor 27 provide RC coupling of the camera video signal into the base of transistor 29. The nonlinear base-emitter characteristics of transistor 29 will cancel the nonlinear base emitter characteristics of transistor 31. Transistor 31 is nominally a common-emitter amplifier with emitter degeneration such that the voltage gain is approximately the ratio of resistor 32 to resistor 33 (in this preferred embodiment the voltage gain is 10). The emitter of transistor 31 is reversed biased by the voltage divider action of potentiometer 36 and diode 37. Transistor 31 does not conduct until its base becomes approximately 0.6 volts more positive than its emitter. At this point, diode 37 becomes reverse biased and transistor 31 functions as a linear amplifier with a gain of 10. Because the base emitter "turn-on" characteristic of transistor 31 is cancelled by the equal but opposite base emitter characteristic of transistor 29, the "turn-on" voltage can be set very near to zero volts at the input.

Transistor 41 together with resistors 43 and 44 form a unity gain level shifting stage.

The entire circuit made up of transistors 29, 31 and 41 and the associated components may be thought of as an amplifier with the potentiometer 36 functioning as a brightness control. The potentiometer 36 is adjusted based on the output signal from the camera to provide the best picture on the video display. Resistor 45 is used as a damping resistor.

Transistor 46 and resistor 47 compose an emitter follower which provides a bias voltage for transistor 48. Essentially, the approximately 0.7 V rise from the base to emitter of transistor 46 compensates for the approximately 0.7 V drop from the base to emitter of transistor 48, which preserves linearity and maintains the relative brightness of the image on the video display.

The video signal from computer 11 is provided through resistor 52, which is used for damping, to the base of the transistor 54. The resistor 55 and transistor 54 compose an emitter follower which provides a bias voltage for transistor 49 in the same manner that transistor 46 provides a bias voltage for transistor 48.

Transistors 48 and 49 are operated as two emitter followers having a common emitter resistor 51. Essentially, the video signal from the computer is applied to the base of transistor 49 while the video signal from the camera is applied to the base of transistor 48. The one of transistors 48 and 49 having the most positive base voltage will reverse bias the emitter of the other transistor. The circuit output taken at resistor 51 will thus be equal to the most positive base voltage. This output is provided by coaxial cable to the CRT monitor.

In operation, the circuit made up of transistors 46, 48, 49 and 54 provides for very fast, smooth switching between the computer video and the camera video. The composite video is thus a multiplexed combination of the computer video and the camera video. The switching is done so rapidly that it has no effect on the observer.

The circuit illustrated in FIG. 2 for combining two video signals has several advantages. First, the circuit has an excellent frequency response which prevents overshoot or ringing which would cause smearing or shadows on the CRT display. Second, because there is no actual addition of the video signals, both video signals may be adjusted for maximum dynamic range without saturating the CRT.

The horizontal synchronization pulses from the computer 11 are buffered by two inverters 61 and 62 which are connected in parallel. In like manner, the vertical synchronization pulses from the computer 11 are buffered by two inverters 64 and 65 which are connected in parallel. The inverter 67 is connected in series with the parallel combination of inverters 61 and 62 and is utilized to avoid polarity inversion of the horizontal sync pulses.

The diode 37 in FIG. 2 is a 1N914. All NPN transistors are 2N3904. All PNP transistors are 2N3905.

Referring now to FIG. 3, the range data in the Polaroid Ultrasonic Ranging Unit 18 is generated in a three-decade binary-coded decimal (BCD) counter with multiplexed outputs. This data is supplied from the ranging unit in parallel to three octal D flip-flops 81–83 which have tri-state outputs. The tri-state outputs permit the octal D flip-flops 81–83 to be multiplexed directly onto the data bus of the Apple II+ Computer.

The three-decade BCD counter, located in the Polaroid Ultrasonic Ranging Unit 18, sequentially places the BCD code for each decade on the BCD output lines and activates a corresponding strobe signal. The timing of the strobes and data from the three-decade BCD counter is such that data is not stable on either edge of the strobes. Therefore, each strobe triggers a monostable multivibrator 86–88 respectively. The trailing edge of the monostable multivibrator output pulse clocks the BCD data into the corresponding octal D flip-flops 81–83. The strobe for the most significant digit sets a "new data ready" flip-flop 91 as well as loading the BCD data into octal D flip-flop 83.

The Apple II+ Computer provides an address to the sonar interface board 19 through the decoder 93. Four specific hexadecimal addresses (COA0, COA1, COA2 and COA3) appear on the output pins of the decoder 93 during the "phase zero" clock period of the Apple II+ Computer. The decoded address COA0 causes the data stored in the least significant digit flip-flop 81 to be placed on the data lines for the Apple II+ Computer. The addresses COA1 and COA2 place the more significant digits on the data lines in a similar manner. The new "data ready" flip-flop 91 is reset by address COA3.

Figure 4:
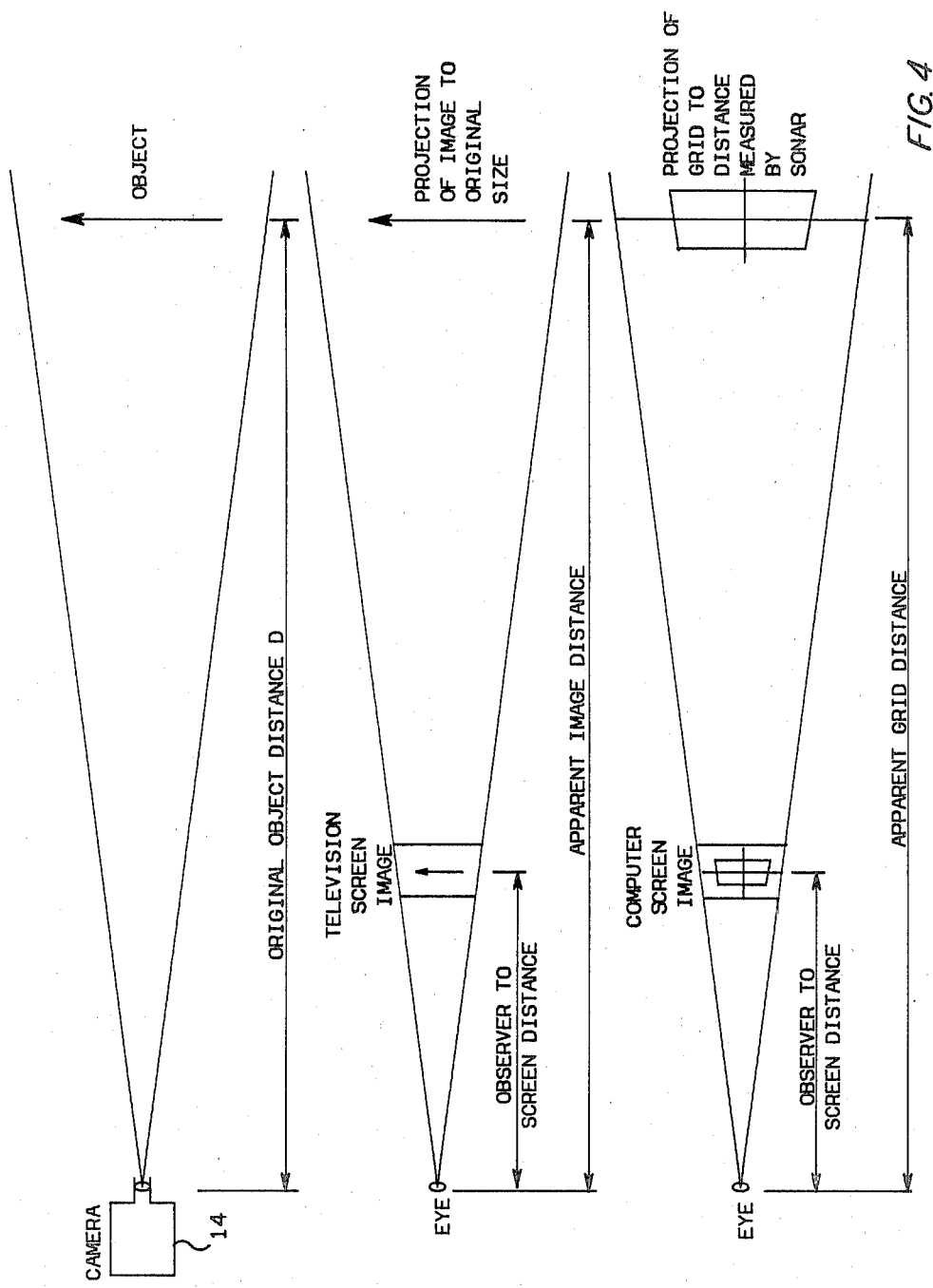
FIG. 4 is a diagrammatic illustration of the scaling theory of the present invention.

Referring now to FIG. 4, the image on a television screen is a two-dimensional projection of the three-dimensional space viewed by the television camera. If an observing viewpoint (referred to hereinafter as the "Eye") is positioned at the proper distance from the television screen (as determined by the field of view of the camera lens), then the image on the television screen will reproduce the perspective of the original scene as recorded by the camera. It is as though the original scene lies beyond the screen, with all of the full sized objects located at the appropriate distances from the Eye.

The sonar distance information is utilized to determine the proper size of the grid to draw onto the CRT screen. The grid must be drawn such that its projection into space behind the screen would make a grid of the proper dimensions at a distance from the Eye equal to the original objects distance from the camera as is illustrated in FIG. 4. It is noted that the size of the CRT screen will affect image size and therefore apparent distance, but the CRT screen size affects the grid display and the camera image identically so that there is no distortion of scale.

A commercially available 3-D animation program from Sublogic Company (Sublogic A2-3D1 Animation Program) is used as a base for the generation of a grid pattern in the Apple II+ computer. The grid pattern is defined in a special graphics language set forth in Appendix I which is then interpreted by the animation program.

The Sublogic A2-3D1 Animation Program works by converting an artificial 3-D world (as defined in the graphics language by the user) into a 2-D projection in the computer's memory. To do this, the animation program must be given a data base consisting of an arrangement of points and lines in an artificial volume of space, the location and orientation of the Eye, and the Eye-to-screen distance.

The grid pattern is defined as a pattern of lines and points lying on the XY plane. The Eye is located on the Z axis facing the origin. The Z position of the Eye is determined by the camera-to-object distance as measured by the sonar instrument.

Figure 5:
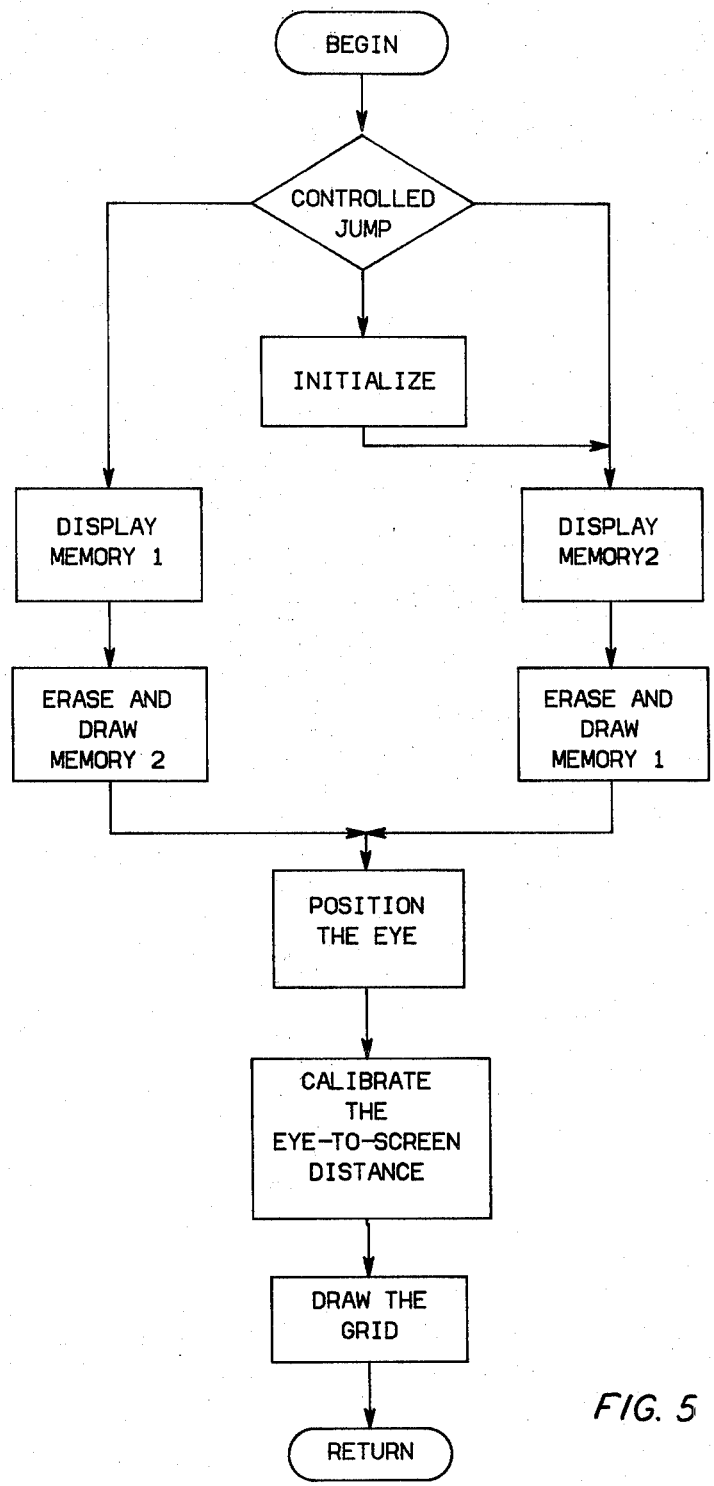
FIG. 5 is a flow chart for the grid data base generation.
Figure 6:
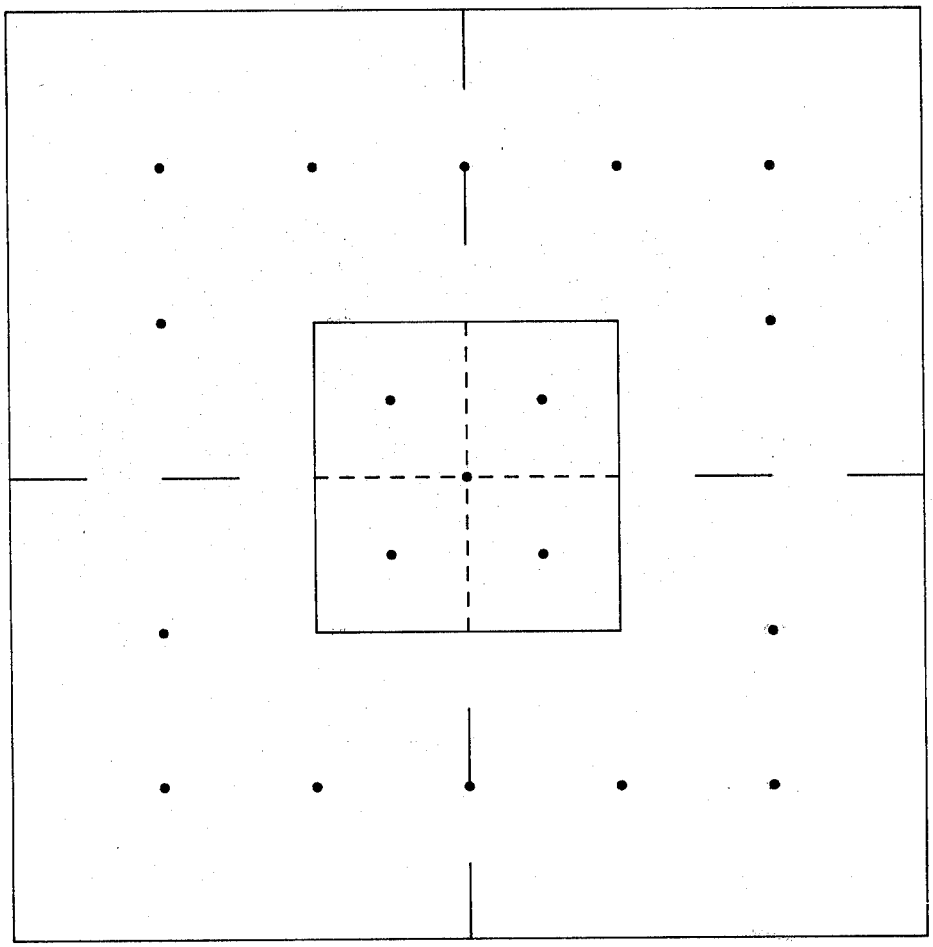
FIG. 6 is a representation of the actual grid generated by the grid data base.

The grid data base listing in the 3-D animation language of Appendix I is set forth in Appendix II. A flow chart for the grid data base generation is illustrated in FIG. 5. The grid generated by the grid data base listing is illustrated in FIG. 6. It is noted that the Apple II+ Computer can display either of two memory areas as high resolution graphics on the CRT screen. These memory areas are referred to as memory 1 and memory 2 in the flow chart illustrated in FIG. 5 and also in the flow chart illustrated in FIG. 7. The grid data base program is designed to display the contents of the first memory while the second memory is being erased and redrawn. Then, the contents of the second memory is displayed while the first memory is redrawn. This provides a steady display.

Figure 7:
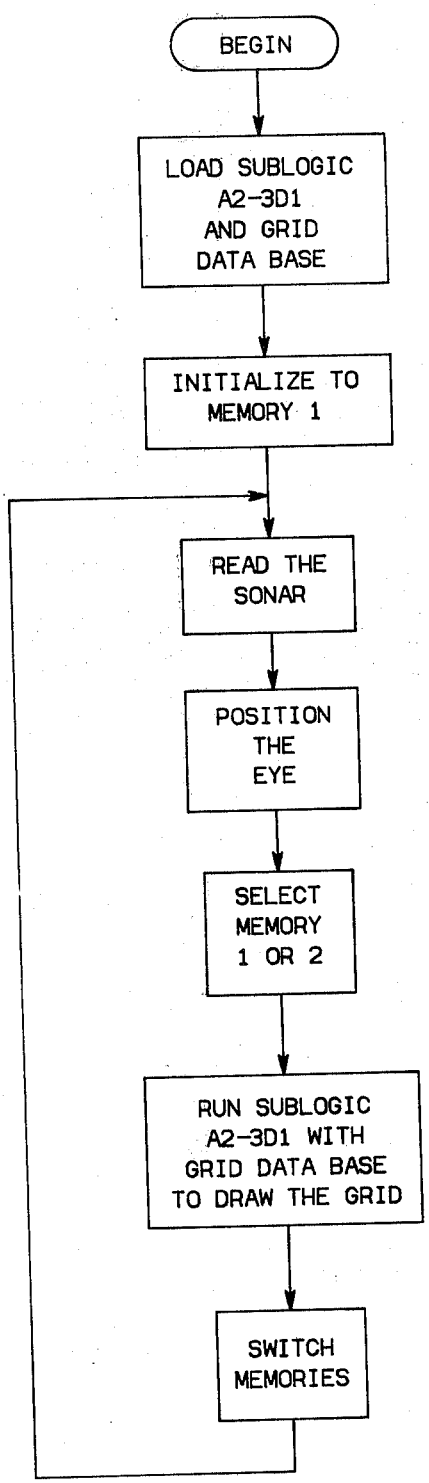
FIG. 7 is a flow chart for the BASIC program which controls the generation of the grid.

A program written in BASIC controls the loading and execution of the animation program and the grid data base. This program is set forth in Appendix III. A flow chart for the program is illustrated in FIG. 7. Line 500 in the BASIC program controls a jump instruction in the grid data base which effectively selects either memory 1 or memory 2. Line 510 causes the Sublogic Animation Program to interpret the grid data base instruction which will cause the contents of one memory to be displayed while the other memory is erased and redrawn. The position of the Eye and the jump destination are defined by the BASIC program before this program is interpreted. Line 29494 defines field of view and aspect ratio for the camera. It is noted that the field of view and aspect ratio for the camera must be tailored to the optics of the specific camera and lens. It would be possible to accommodate a zoom (variable focal length) lens with the present invention if a signal indicating lens focal length was interfaced to the computer.

The invention has been illustrated and described in terms of a preferred embodiment as illustrated in FIGS. 1–7. It is noted that the circuitry illustrated in FIGS. 2 and 3 is the preferred circuitry for interfacing the elements of the video image size scaling system. Many different circuit configurations could be utilized to accomplish this function and such different circuit configurations are within the scope of the present invention, as claimed.

Also, the software utilized to generate the grid required for the video image size scaling has been described in terms of a preferred software listing and flow chart. As in the case of the electrical circuitry, many different software packages could be utilized to accomplish the generation of the grid and such different software packages and listings are within the scope of the present invention, as claimed.

APPENDIX I

A2-3D1 3D ANIMATION PROGRAM LANGUAGE

| COMMAND NAME | COMMAND (decimal) | COMMAND (hex) | ARGUMENTS | FUNCTION |
|---|---|---|---|---|
| PNT | 00 | 00 | X lsb, X msb, Y lsb, Y msb, Z lsb, Z msb | Define 3D Point |
| SPNT | 01 | 01 | X lsb, X msb, Y lsb, Y msb, Z lsb, Z msb | Define 3D Start Point |
| CPNT | 02 | 02 | X lsb, X msb, Y lsb, Y msb, Z lsb, Z msb | Define 3D Continue Point |
| RAY | 03 | 03 | X lsb, X msb, Y lsb, Y msb, Z lsb, Z msb | Define 3D Ray |
| CLPSW | 04 | 04 | n where n = 0 clipper on, n = 1 clipper off | Clipper Control Switch |
| EYE | 05 | 05 | X lsb, X msb, Y lsb, Y msb, Z lsb, Z msb, P, B, H | Viewer's X, Y, Z, P, B, H |
| LIN2D | 06 | 06 | X1, Y1, X2, Y2 | Draw 2D Line from Point 1 to 2 |
| DISP | 07 | 07 | n where n = 50 set graphics n = 51 set text n = 52 clear mixed n = 53 set mixed n = 54 page 1 set n = 55 page 2 set n = 56 clear HI-RES n = 57 set HI-RES | Display Screen Select |
| ERAS | 08 | 08 | n where n = 00 erase page 1 n = 01 erase page 2 n = 02 fill page 1 n = 03 fill page 2 | Erase Screen |
| DRAW | 09 | 09 | n where n = 00 draw page 1 n = 01 draw page 2 | Write Screen Select |
| PNT2D | 10 | 0A | X, Y | Plot 2D Point |
| JMP | 11 | 0B | A lsb, A msb where A is the jump address | Interpretive Jump |
| LMODE | 12 | 0C | n where n = 00 normal line n = 01 exclusive or line | Set Line Drawing Mode |
| ARRAY | 13 | 0D | A lsb, A msb where A is output array start address | Turn On Output Array Generation |
| SCRSZ | 14 | 0E | Screen width, Screen height, X center, Y center | Screen Size Selection |
| FIELD | 15 | 0F | axr lsb, axr msb, ayr lsb, ayr msb, azr lsb, azr msb | Field of View Selection |
| INIT | 16 | 10 | none | Easy Initialize |
| NOP | 17 | 11 | none | No Operation |

APPENDIX II

GRID DATA BASE LISTING

```
>RUN
ENTER STARTING MEMORY LOCATION (DECIMAL)
?29440
29440 JMP    29465              29506 SPNT   -120,   -120,   0
29443 NOP                       29513 CPNT   -120,    120,   0
29444 NOP                       29520 CPNT    120,    120,   0
29445 NOP                       29527 CPNT    120,   -120,   0
29446 NOP                       29534 CPNT   -120,   -120,   0
29447 NOP                       29541 SPNT     10,      0,   0
29448 NOP                       29548 CPNT     20,      0,   0
29449 INIT                      29555 SPNT     30,      0,   0
29450 DISP   CLEAR MIXED        29562 CPNT     40,      0,   0
29452 DISP   SET PAGE 2         29569 SPNT     50,      0,   0
29454 ERAS   ERASE PAGE 1       29576 CPNT     60,      0,   0
29456 DRAW   PAGE 1             29583 SPNT     70,      0,   0
29458 NOP                       29590 CPNT     80,      0,   0
29459 NOP                       29597 SPNT     90,      0,   0
29460 NOP                       29604 CPNT    100,      0,   0
29461 NOP                       29611 SPNT    110,      0,   0
29462 JMP    29480              29618 CPNT    120,      0,   0
29465 NOP                       29625 SPNT      0,     10,   0
29466 NOP                       29632 CPNT      0,     20,   0
29467 NOP                       29639 SPNT      0,     30,   0
L                               L
29468 DISP   SET PAGE 1         29646 CPNT      0,     40,   0
29470 ERAS   ERASE PAGE 2       29653 SPNT      0,     50,   0
29472 DRAW   PAGE 2             29660 CPNT      0,     60,   0
29474 NOP                       29667 SPNT      0,     70,   0
29475 NOP                       29674 CPNT      0,     80,   0
29476 NOP                       29681 SPNT      0,     90,   0
29477 NOP                       29688 CPNT      0,    100,   0
29478 NOP                       29695 SPNT      0,    110,   0
29479 NOP                       29702 CPNT      0,    120,   0
29480 NOP                       29709 SPNT      0,    -10,   0
```

APPENDIX II-continued
GRID DATA BASE LISTING

| | | | | | | | |
|---|---|---|---|---|---|---|---|
| 29481 NOP | | | | 29716 CPNT | 0, | −20, | 0 |
| 29482 NOP | | | | 29723 SPNT | 0, | −30, | 0 |
| 29483 NOP | | | | 29730 CPNT | 0, | −40, | 0 |
| 29484 EYE | | | | 29737 SPNT | 0, | −50, | 0 |
| | 0 | 0, | −102 | 29744 CPNT | 0, | −60, | 0 |
| | P = 0 | B = 0 | H = 0 | 29751 SPNT | 0, | −70, | 0 |
| 29494 FIELD | 25000, | 32767, | 5200 | 29758 CPNT | 0, | −80, | 0 |
| 29501 NOP | | | | 29765 SPNT | 0, | −90, | 0 |
| 29502 NOP | | | | 29772 CPNT | 0, | −100, | 0 |
| 29503 NOP | | | | 29779 SPNT | 0, | 110, | 0 |
| 29504 NOP | | | | L | | | |
| 29505 NOP | | | | | | | |
| L | | | | | | | |
| 29786 CPNT | 0, | −120, | 0 | 29996 SPNT | 0, | −180, | 0 |
| 29793 SPNT | −10, | 0, | 0 | 30003 CPNT | 0, | −240, | 0 |
| 29800 CPNT | −20, | 0, | 0 | 30010 SPNT | 0, | −300, | 0 |
| 29807 SPNT | −30, | 0, | 0 | 30017 CPNT | 0, | −360, | 0 |
| 29814 CPNT | −40, | 0, | 0 | 30024 SPNT | −360, | −360, | 0 |
| 29821 SPNT | −50, | 0, | 0 | 30031 CPNT | −360, | 360, | 0 |
| 29828 CPNT | −60, | 0, | 0 | 30038 CPNT | 360, | 360, | 0 |
| 29835 SPNT | −70, | 0, | 0 | 30045 CPNT | 360, | −360, | 0 |
| 29842 CPNT | −80, | 0, | 0 | 30052 CPNT | −360, | −360, | 0 |
| 29849 SPNT | −90, | 0, | 0 | 30059 PNT | 120, | 240, | 0 |
| 29856 CPNT | −100, | 0, | 0 | L | | | |
| 29863 SPNT | −110, | 0, | 0 | | | | |
| 29870 CPNT | −120, | 0, | 0 | 30066 PNT | −120, | 240, | 0 |
| 29877 PNT | 60, | 60, | 0 | 30073 PNT | 120, | −240, | 0 |
| 29884 PNT | −60, | 60, | 0 | 30080 PNT | −120, | −240, | 0 |
| 29891 PNT | −60, | −60, | 0 | 30087 PNT | 240, | 120, | 0 |
| 29898 PNT | 60, | −60, | 0 | 30094 PNT | −240, | 120, | 0 |
| 29905 PNT | 0, | 0, | 0 | 30101 PNT | 240, | −120, | 0 |
| 29912 SPNT | 180, | 0, | 0 | 30108 PNT | −240, | −120, | 0 |
| 29919 CPNT | 240, | 0, | 0 | 30115 PNT | 240, | 240, | 0 |
| L | | | | 30122 PNT | −240, | 240, | 0 |
| | | | | 30129 PNT | −240, | −240, | 0 |
| 29926 SPNT | 300, | 0, | 0 | 30136 PNT | 240, | −240, | 0 |
| 29933 CPNT | 360, | 0, | 0 | 30143 EOF | | | |
| 29940 SPNT | −180, | 0, | 0 | 30144 EOF | | | |
| 29947 CPNT | −240, | 0, | 0 | 30145 EOF | | | |
| 29954 SPNT | −300, | 0, | 0 | 30146 EOF | | | |
| 29961 CPNT | −360, | 0, | 0 | 30147 EOF | | | |
| 29968 SPNT | 0, | 180, | 0 | 30148 EOF | | | |
| 29975 CPNT | 0, | 240, | 0 | 30149 EOF | | | |
| 29982 SPNT | 0, | 300, | 0 | 30150 EOF | | | |
| 29989 CPNT | 0, | 360, | 0 | 30151 EOF | | | |

APPENDIX III
BASIC PROGRAM LISTING

```
LIST
  1 REM       VIDEO IMAGE SCALER
  2 REM
  3 REM
 10 REM       THIS PROGRAM OPERATES
 11 REM       IN CONJUNCTION WITH THE
 12 REM       FOLLOWING:
 20 REM       VIDEO MIXER BOARD
 22 REM       SONAR INTERFACE BOARD
 24 REM       SUBLOGIC A2-3D1 PROGRAM
 26 REM       GRID DATA BASE
 28 REM
 30 REM       THE SUBLOGIC PROGRAM AND
 31 REM       GRID DATA ARE LOADED
 32 REM       FROM THE EPROM EXPANSION
 33 REM       BOARD INTO MEMORY AT
 34 REM       LOCATIONS $6000-$77FF.
 35 REM       IF NO EPROM EXPANSION
 36 REM       BOARD IS USED, THEN THE
 37 REM       PROGRAM AND DATA MUST BE
 38 REM       LOADED FROM TAPE OR
 39 REM       DISK, & LINE 99 IN THIS
 40 REM       PROGRAM MUST BE DELETED.
 43 REM
 45 REM       THE GRID LIES ON THE X-Y
 46 REM       PLANE, AND THE VIEWPOINT
 47 REM       IS ON THE NEGATIVE Z-
 48 REM       AXIS, FACING THE ORIGIN.
 49 REM       THE Z-AXIS POSITION OF
 50 REM       THE EYE IS COMPUTED FROM
 51 REM       THE RANGE DATA OBTAINED
 52 REM       BY THE SONAR.
 55 REM
 60 REM       BOTH HIGH-RESOLUTION
 61 REM       SCREENS OF THE APPLE
 62 REM       ARE USED SUCH THAT THE
 63 REM       ERASING AND RE-DRAWING
 64 REM       OF THE GRID IS INVISIBLE
 65           REM TO THE OBSERVER.
 68           REM
 69           REM
 99   X = PEEK (53247): X = PEEK (4
      9920): CALL 52576: X = PEEK
      (53247)
100   EYE = 29484
110   J1 = 12: REM SCRN 1 DRAW
120   J2 = 25: REM SCRN 2 DRAW
130   J = 9: REM START
200   REM READ THE SONAR
202   REM AUTO CONTROL OF EYE
203   ZV = 1200 * (PEEK (49314) −
      240) + 120 * (PEEK (49313) −
      240) + 12 * (PEEK (49312) −
      240): GOTO 220
204   REM MANUAL CONTROL OF EYE
205   GET C$: IF C$ = CHR$ (8) THEN
      ZV = ZV − ZV / 10
210   IF C$ = CHR$ (21) THEN ZV =
      ZV + ZV / 10 + 1
```

APPENDIX III-continued

BASIC PROGRAM LISTING

| LIST | |
|---|---|
| 220 | IF ZV > 32767 OR ZV < 0 THEN ZV = 32767 |
| 300 | REM POSITION THE EYE |
| 310 | LS = 65536 − ZV |
| 320 | IF ZV = 0 THEN LS = 0 |
| 330 | MS = INT (LS / 256) |
| 340 | LS = INT (LS − MS * 256) |
| 350 | POKE EYE + 5, LS |
| 360 | POKE EYE + 6, MS |
| 500 | POKE 29441, J |
| 510 | CALL 24576: REM DRAW GRID |
| 600 | IF J < > J2 THEN J = J2: GOTO 700 |
| 610 | J = J1 |
| 700 | REM |
| 900 | LS = FRE (0) |
| 999 | GOTO 200: REM LOOP |

That which is claimed is:

1. Apparatus comprising: means for generating a first signal representative of the distance between an object and means for generating an image of said object; and means for generating a calibrated grid for a video display means in response to said first signal, wherein the size of said calibrated grid on said video display is a function of the magnitude of said first signal and wherein said calibrated grid provides a measurement of the actual size of said object when said image and said calibrated grid are displayed together on said video display means.

2. Apparatus in accordance with claim 1 wherein said means for generating said first signal comprises a sonar distance measuring instrument and wherein said means for generating said image comprises a television camera.

3. Apparatus in accordance with claim 2 wherein said means for generating said calibrated grid comprises a computer which generates a grid video signal representative of said calibrated grid and wherein said television camera generates a camera video signal representative of said image.

4. Apparatus in accordance with claim 3 additionally comprising means for synchronizing said camera video signal with said grid video signal.

5. Apparatus in accordance with claim 4 additionally comprising means for combining said camera video signal with said grid video signal to form a composite video signal and for supplying said composite video signal to said video display means, wherein said calibrated grid is superimposed over said image when both said image and said calibrated grid are displayed together on said video display means.

6. Apparatus in accordance with claim 5 wherein said means for combining said camera video signal and said grid video signal to form said composite video signal comprises means for multiplexing said camera video signal and said grid video signal.

7. Apparatus in accordance with claim 6 wherein said object, said sonar distance measuring instrument and said television camera are located under water.

8. Apparatus comprising:
a computer means;
a television camera having a disabled internal sync generator;
means for providing horizontal synchronization pulses from said computer means to said television camera means;
means for providing vertical synchronization pulses from said computer means to said television camera means;
a sonar distance measuring instrument;
means for providing data representing the distance between said television camera means and an object in the field of view of said television camera means from said sonar distance measuring instrument to said computer means, wherein said computer means generates a grid video signal representative of a calibrated grid for a video display means in response to said distance data;
a video display means;
means for combining said grid video signal and the video signal provided as an output from said television camera means to establish a composite video signal; and
means for providing said composite video signal to said video display means, wherein both said object and said calibrated grid are displayed on said video display means and wherein the size of said calibrated grid on said video display means provides a measurement of the actual size of said object.

9. Apparatus in accordance with claim 8 wherein said means for combining said grid video signal and the video signal provided as an output from said television camera means to establish said composite video signal comprises means for multiplexing said grid video signal and the video signal provided as an output from said television camera means to establish said composite video signal.

10. Apparatus in accordance with claim 9 wherein said television camera, said sonar distance measuring instrument and said object are located underwater.

11. Apparatus in accordance with claim 8 wherein said calibrated grid is superimposed over said object on said video display means.

12. A method for generating a calibrated grid for a video display comprising the steps of:
generating a first signal representative of the distance between an object and means for generating an image of said object; and
generating a calibrated grid for a video display in response to said first signal, wherein the size of said calibrated grid on said video display is a function of the magnitude of said first signal.

13. A method in accordance with claim 12 additionally comprising the steps of:
displaying said image and said calibrated grid together on said video display; and
using said calibrated grid to measure the actual size of said object.

14. A method in accordance with claim 13 wherein said step of generating said first signal comprises reflecting sonar waves off of said object to measure said distance.

15. A method in accordance with claim 14 wherein said object and said television camera are located under water and wherein said sonar waves are generated under water.

16. A method in accordance with claim 13 wherein said step of generating said calibrated grid comprises using a computer to generate a grid video signal representative of said calibrated grid and wherein a television camera is utilized to generate a camera video signal representative of said image.

17. A method in accordance with claim 16 additionally comprising the step of synchronizing said camera video signal with said grid video signal.

18. A method in accordance with claim 17 additionally comprising the steps of:
combining said camera video signal to form a composite video signal; and
displaying said composite video signal on said video display.

19. A method in accordance with claim 18 wherein said step of combining said camera video signal and said grid video signal to form said composite video signal comprises multiplexing said camera video signal and said grid video signal.

20. A method for measuring the actual size of an object in the field of view of a television camera comprising the steps of:
disabling the internal sync generator of said television camera;
providing horizontal synchronization pulses and vertical synchronization pulses from a computer to said television camera to thereby control the horizontal synchronization and vertical synchronization of said television camera;
using sonar to measure the distance between said television camera and said object;
providing data representative of the said distance to said computer;
using said computer to generate a grid video signal representative of a calibrated grid for a video display in response to said distance data;
combining said grid video signal and the video signal provided as an output from said television camera to establish a composite video signal; and
displaying said composite video signal, wherein both said object and said calibrated grid are displayed when said composite video signal is displayed and wherein the size of said calibrated grid provides a measurement of the actual size of said object.

21. A method in accordance with claim 20 wherein said step of combining said grid video signal and the video signal provided as an output from said television camera to establish said composite video signal comprises multiplexing said grid video signal and the video signal provided as an output from said television camera.

22. A method in accordance with claim 20 wherein said television camera, said object and said sonar are located underwater.

* * * * *